(12) United States Patent
Lan et al.

(10) Patent No.: US 11,230,671 B2
(45) Date of Patent: Jan. 25, 2022

(54) COUPLING REACTION APPARATUS FOR HEAVY OIL PYROLYSIS-GASIFICATION

(71) Applicant: CHINA UNIVERSITY OF PETROLEUM-BEIJING, Beijing (CN)

(72) Inventors: Xingying Lan, Beijing (CN); Yuming Zhang, Beijing (CN); Jinsen Gao, Beijing (CN); Xiaogang Shi, Beijing (CN); Chengxiu Wang, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 0 days.

(21) Appl. No.: 17/028,994

(22) Filed: Sep. 22, 2020

(65) Prior Publication Data

US 2021/0087475 A1 Mar. 25, 2021

(30) Foreign Application Priority Data

Sep. 23, 2019 (CN) .......................... 201910900595.9

(51) Int. Cl.
 *B01J 8/00* (2006.01)
 *B01J 8/18* (2006.01)
 (Continued)

(52) U.S. Cl.
 CPC ................ *C10G 9/36* (2013.01); *B01J 8/005* (2013.01); *B01J 8/1827* (2013.01); *B01J 8/1863* (2013.01);
 (Continued)

(58) Field of Classification Search
 CPC ....... B01J 8/00; B01J 8/005; B01J 8/18; B01J 8/1818; B01J 8/1827; B01J 8/1845; B01J 8/1863; B01J 8/1872; B01J 8/26; B01J 8/28; B01J 19/00; B01J 19/24; B01J 2208/00; B01J 2208/00796; B01J 2208/00893; B01J 2208/00902; B01J 2208/00911; B01J 2219/00; B01J 2219/24; C10G 9/00; C10G 9/34; C10G 9/36; C10G 31/00; C10G 31/08; C10G 57/00; C10G 2300/00; C10G 2300/80; C10G 2300/805; C10G 2300/807
 See application file for complete search history.

(56) References Cited

U.S. PATENT DOCUMENTS 3,779,893 A * 12/1973 Leas ...................... C10G 1/083
 208/424

FOREIGN PATENT DOCUMENTS

CN 101451073 A 6/2009
CN 102827629 A 12/2012
(Continued)

OTHER PUBLICATIONS

The first OA of CN application No. 201910900595.9.

*Primary Examiner* — Natasha E Young
(74) *Attorney, Agent, or Firm* — J.C. Patents

(57) ABSTRACT

A coupling reaction apparatus for heavy oil cracking-gasification, including a cracking section and a gasification section communicated with each other, and the cracking section is located above the gasification section; the cracking section is provided with a heavy oil raw material inlet and a fluidizing gas inlet, and an upper part of the cracking section is provided with an oil-gas outlet; and the gasification section is provided with a gasification agent inlet.

14 Claims, 2 Drawing Sheets

(51) Int. Cl.
*B01J 8/26* (2006.01)
*B01J 8/28* (2006.01)
*B01J 19/00* (2006.01)
*B01J 19/24* (2006.01)
*C10G 9/36* (2006.01)
*C10G 31/08* (2006.01)
*C10G 57/00* (2006.01)

(52) U.S. Cl.
CPC ............... *B01J 8/1872* (2013.01); *B01J 8/26* (2013.01); *B01J 8/28* (2013.01); *C10G 31/08* (2013.01); *C10G 57/00* (2013.01); *B01J 2208/00902* (2013.01); *B01J 2208/00911* (2013.01); *C10G 2300/807* (2013.01)

(56) References Cited

FOREIGN PATENT DOCUMENTS

| | | |
|---|---|---|
| CN | 102942954 A | 2/2013 |
| CN | 107099328 A | 8/2017 |
| CN | 108587674 A | 9/2018 |

\* cited by examiner

COUPLING REACTION APPARATUS FOR HEAVY OIL PYROLYSIS-GASIFICATION

CROSS-REFERENCE TO RELATED APPLICATIONS

This application claims priority to Chinese Patent Application No. 201910900595.9, filed on Sep. 23, 2019, which is hereby incorporated by reference in its entirety.

TECHNICAL FIELD

The present disclosure relates to a coupling reaction apparatus for heavy oil cracking-gasification, which belongs to the technical field of petroleum processing.

BACKGROUND

With the crude oil becoming heavier and poorer in quality, the production of an inferior heavy oil (viscous oil, super viscous oil, oil sand asphalt, vacuum residue, oil slurry, de-oiled asphalt, etc.) has greatly increased. The inferior heavy oil usually has the characteristics of low H/C ratio, high content of sulfur, nitrogen and heavy metals, large carbon residue value, and inner enriched carbon residue and asphaltene component cause serious coke-forming tendency of the heavy oil during processing. Due to the problems of catalyst deactivation, high hydrogen consumption and long-term operation and so on, it is difficult to satisfy the requirements of directly processing a large amount of the inferior heavy oil by directly using the means of catalytic cracking or catalytic hydrogenation and so on. Compared to one-step heavy oil processing technology, processing the inferior heavy oil by a technology combination of solvent deasphalting, visbreaking, catalytic cracking, hydrotreating with delayed coking and so on has a longer overall technological process and a higher investment cost.

The delayed coking technology, as a widely used inferior heavy oil processing technology at present, has the problems of coking in a furnace tube, high environmental protection pressure during decoking and low liquid yield and the like. In addition, a large amount of solid coke is by-produced by the delayed coking technology, and especially the value of a high-sulfur coke is very low, and measures are taken to restrict delivery of the high-sulfur coke having a sulfur content of >3% according to the latest environmental protection requirements. In some domestic refineries, a petroleum coke produced by the delayed coking is used in circulating fluid bed combustion power generation or gasification multiple co-production technology to realize conversion and utilization of the coke. The heavy oil is firstly converted into the petroleum coke with low activity, and then subjected to cooling, grinding, and is converted by heating again, however, the overall technological process is complex and the efficiency is low.

In addition, since a raw material of the inferior heavy oil has a low H/C atomic ratio, it is necessary to use hydrogenation process to maximize the production of light oil products and satisfy quality requirements of clean oil products. Therefore, the lack of hydrogen sources is more prominent during the processing of the inferior heavy oil in refineries, and the hydrogen produced during technologies of catalytic reforming and so on is not enough to meet hydrogen requirements for clean production of oil products. Although the direct gasification of the inferior heavy oil can directly convert the heavy oil into small molecules such as synthesis gas and the like, oil-gas molecules and hydrogen elements in the heavy oil are not fully utilized, which also causes the waste of heavy oil resources to a certain extent.

In view of the above problems, many researchers have proposed corresponding short-process technical solutions for the processing and conversion of the inferior heavy oil, a flexible coking series technology developed by Exxon company and with fluidized coke powders as a bed material for heavy oil cracking reaction is one of the solutions.

In the flexible coking technology, the coke powders are used as a heat carrier for the heavy oil cracking reaction, and cokes generated are attached to surfaces of the coke powders and transported to a gasification/combustion reactor for removal. Therefore, a coke material in reactions is recycled among reactors, such as a coking reactor, a combustion and gasification reactor and so on, which not only makes it difficult for a coke powder material to be recycled among a plurality of reactors, but also makes it difficult to realize direct material flow or heat exchange between coke gasification and heavy oil coking reactions, thereby increasing energy consumption of the cracking reaction.

SUMMARY

The present disclosure provides a coupling reaction apparatus for heavy oil cracking-gasification, which can realize cooperation of two reaction processes of heavy oil cracking and gasification, thereby obtaining oil-gas and synthesis gas with high yield and high quality, and reducing energy consumption of the cracking reaction.

The present disclosure provides a coupling reaction apparatus for heavy oil cracking-gasification, including:

a cracking section and a gasification section communicated with each other, and the cracking section is located above the gasification section;

the cracking section is provided with a heavy oil raw material inlet and a fluidizing gas inlet, and an upper part of the cracking section is provided with an oil-gas outlet; and the gasification section is provided with a gasification agent inlet.

The coupling reaction apparatus as described above further includes a water vapor stripping section and a particle size refining section communicated with each other;

the water vapor stripping section and the particle size refining section are disposed between the cracking section and the gasification section, and are communicate with the cracking section and the gasification section respectively;

the water vapor stripping section is located above the particle size refining section; and the water vapor stripping section is provided with a stripping water vapor inlet, and the particle size refining section is provided with a grinding water vapor inlet.

The coupling reaction apparatus as described above further includes a gas-solid separation section, and the gas-solid separation section is located above the cracking section, and is configured to perform a gas-solid separation treatment on oil-gas of the cracking section.

The coupling reaction apparatus as described above further includes a cooling and washing section, and the cooling and washing section is located above the gas-solid separation section, and is configured to perform cooling and washing on the oil-gas treated by the gas-solid separation treatment.

The coupling reaction apparatus as described above further includes an atomizing unit, and the atomizing unit is communicated with the heavy oil raw material inlet, and is configured to perform an atomization treatment on a heavy oil raw material.

In the coupling reaction apparatus as described above, a solid-phase outlet is disposed between the water vapor stripping section and the particle size refining section; and the gasification section is provided with a solid-phase inlet;

the solid-phase outlet is communicated with the solid-phase inlet through a delivery pipeline outside the coupling reaction apparatus.

In the coupling reaction apparatus as described above, the cracking section is a cracking reactor, and the gasification section is a gasification reactor.

In the coupling reaction apparatus as described above, the cracking reactor is coaxially communicated with the gasification reactor.

In the coupling reaction apparatus as described above, a diameter ratio of the cracking reactor to the gasification reactor is 1:(1.5-4).

In the coupling reaction apparatus as described above, an operation pressure inside the coupling reaction apparatus is 0.1-6 Mpa.

The implementation of the present disclosure at least has the following advantages:

1) Compared with technologies of flexible coking and the like, the coupling reaction apparatus for heavy oil cracking-gasification of the present disclosure, by coupling an upper heavy oil cracking section and a lower coke gasification section in a same reaction system, avoids the problems of circulation operation difficulty of materials among a plurality of reactors, complex process, large floor area and high investment, and improves technical economy of the method.

2) The heavy oil cracking-gasification coupling reaction apparatus of the present disclosure gives full play to the cooperation effect among reactions of heavy oil cracking, coke gasification and so on. On the one hand, a coke formed by cracking as a reaction raw material for the gasification section reacts in a gasifier to generate high-quality synthesis gas, avoiding the production of a large amount of low-value petroleum coke and enriching hydrogen sources of refineries; on the other hand, the synthesis gas can not only provide heat for the cracking reaction, but also function as a hydrogen atmosphere for the heavy oil cracking reaction to improve quality of light oil-gas. Through the above processes, technical advantages such as material mutual supply, energy complementary, collaborative reaction, oil-gas co-production and so on among reactions can be realized.

DESCRIPTION OF THE REFERENCE SIGNS

1: cracking section; 2: gasification section; 3: atomizing unit; 4: water vapor stripping section; 5: particle size refining section; 6: gas-solid separation section; 7: cooling and washing section; 8: solid-phase outlet; 9: solid-phase inlet; 10: delivery pipeline; 11: heavy oil raw material inlet; 12: fluidizing gas inlet; 13: oil-gas outlet; 14: carrier supplement inlet; 21: gasification agent inlet; 22: ash discharge outlet; 31: atomizing nozzle; 32: raw material input pipe; 33: input port; 41: stripping water vapor inlet; 42: multi-layer stripping structure; 51: grinding water vapor inlet; 52: jet grinder; 61: gas-solid separator; 62: solid-phase discharge port.

DESCRIPTION OF EMBODIMENTS

In order to make objects, technical solutions and advantages of the present disclosure clearer, the technical solutions in embodiments of the present disclosure will be described clearly and completely in combination with embodiments of the present disclosure. Obviously, the described embodiments are a part of, not all of the embodiments of the present disclosure. Based on the embodiments in the present disclosure, all other embodiments obtained by those skilled in the art without creative labor fall into the protection scope of the present disclosure.

Figure 1:
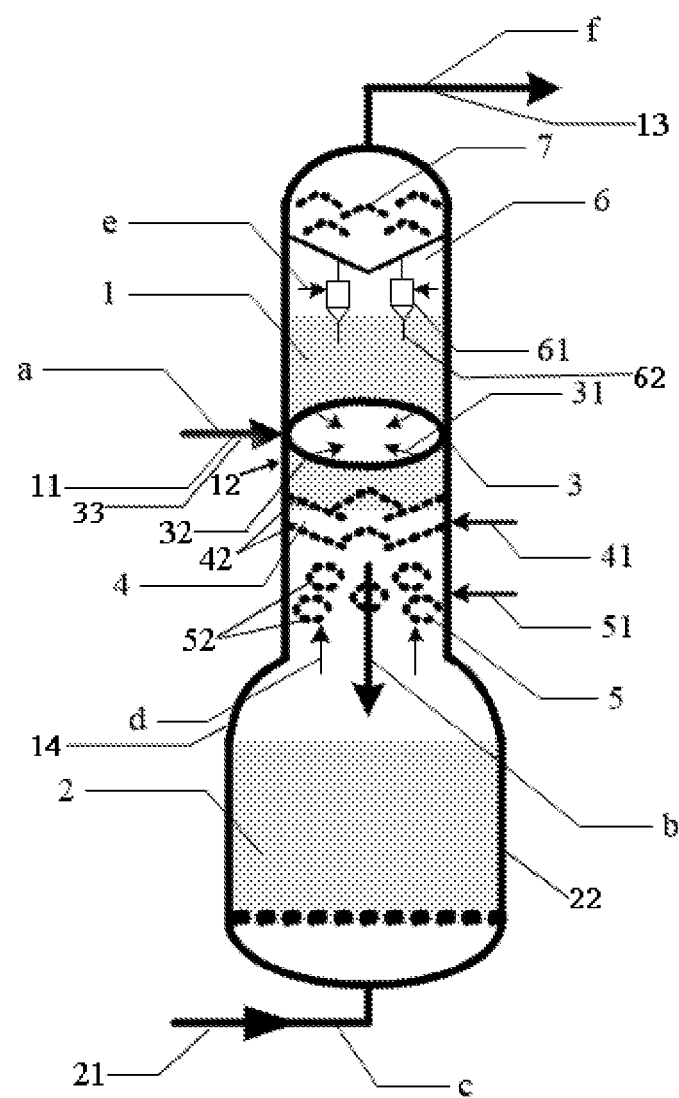
FIG. 1 is a structural schematic diagram of an embodiment of a coupling reaction apparatus for heavy oil cracking-gasification according to the present disclosure.

FIG. 1 is a structural schematic diagram of an embodiment of a coupling reaction apparatus for heavy oil cracking-gasification according to the present disclosure, which includes: a cracking section 1 and a gasification section 2 communicated with each other, and the cracking section 1 is located above the gasification section 2; the cracking section 1 is provided with a heavy oil raw material inlet 11 and a fluidizing gas inlet 12, and an upper part of the cracking section is provided with an oil-gas outlet 13; and the gasification section 2 is provided with a gasification agent inlet 21.

The cracking section 1 is configured to provide a place for cracking a heavy oil raw material a. The cracking section 1 is filled with a cracking carrier, such as coke powders, so that the heavy oil raw material a entering the cracking section 1 through the heavy oil raw material inlet 11 contacts with fluidized coke powders under the effect of a fluidizing gas to perform a cracking reaction, to generate light oil-gas and coke particles b, where the coke particles refer to particles formed by cokes in the heavy oil raw material being attached to surfaces of the coke powders.

Since the cracking section 1 is communicated with the gasification section 2, and the gasification section 2 is located at the bottom of the cracking section 1, therefore, the gasification section 2 can receive coke particles b going downward from the cracking section 1, and enable the coke particles b to perform a gasification reaction under the effect of a gasification agent c entering the gasification section 2 through the gasification agent inlet 21 to generate a synthesis gas d.

The reaction apparatus of the present disclosure is configured to make the cracking section 1 and the gasification section 2 coupled and communicated, and make the cracking section 1 above the gasification section 2, which not only contributes to let the coke particles b in the cracking section 1 go downward and enter the gasification section 2 under the effect of gravity to perform the gasification reaction, but also enables the synthesis gas d generated in the gasification section 2 to go upward and enter into the cracking section 1 to participate in the cracking reaction. Thus, on one hand, the synthesis gas d carrying heat may provide heat required for the cracking reaction, so that the heat for both cracking and gasification reaction sections can be matched and utilized to improve the overall energy efficiency; on the other hand, hydrogen in the synthesis gas d can inhibit a coking reaction of the heavy oil cracking reaction to a certain extent, thereby improving heavy oil cracked product distribution and improving quality and yield of light oil-gas. Moreover, the synthesis gas d can fully fluidize the coke particles in the cracking section 1.

The heavy oil raw material inlet 11 of the cracking section 1 is configured to feed the heavy oil raw material a to the cracking section 1. The fluidizing gas inlet 12 is configured to feed a fluidizing gas to the cracking section 1, so that the coke powders and the coke particles therein are in a fluidized state, which is more conducive to fully contact with the heavy oil raw material a. The oil-gas outlet 13 disposed at the upper part of the cracking section 1 is configured to discharge the upward light oil-gas and synthesis gas in the cracking section 1 for treatment, for example, the light oil-gas and synthesis gas further pass through a gas-liquid fractionation tower and an oil-gas absorption and stabilization tower and other systems to respectively obtain gas products such as synthesis gas, dry gas, liquefied gas and the like, as well as light oil products. Of course, the obtained oil products can be further cut and separated to obtain liquid products of components with different distillation ranges, in which heavy oil (possibly including some solid particles of a contact agent) can be mixed with the heavy oil raw material for refining. The cracking section 1 may also include a carrier supplement inlet 14 for supplementing coke powders to the cracking section 1.

In the coupling reaction apparatus of the present disclosure, a cracking reactor can be used in the cracking section 1, and a gasification reactor can be used in the gasification section 2. In order to ensure smooth flow of materials, the cracking reactor can be coaxially communicated with the gasification reactor.

In order to reduce operation gas speed in the gasification reactor, a diameter ratio of the cracking reactor to the gasification reactor can be 1:(1.5-4), and further, the diameter ratio of the cracking reactor to the gasification reactor can be 1:(2-3).

Because the coupling reaction apparatus of the present disclosure employs such a structure that the cracking reactor at the upper part and the gasification reactor at the lower part are communicated with different diameters, in order to ensure the processing capacity of the coupling reaction apparatus on the heavy oil and enhance the assistance role of the synthesis gas on the cracking reaction, an operation pressure inside the coupling reaction apparatus of the present disclosure can be 0.1-6 Mpa, further 2-4 Mpa.

In addition, in order to ensure full contact of the heavy oil raw material a with the fluidized coke powders in the cracking section 1, an atomizing unit 3 can be disposed at a position corresponding to the heavy oil raw material inlet 11 in the coupling reaction apparatus, so as to be capable of performing an atomization treatment on the heavy oil raw material a, and enable the atomized heavy oil raw material a to contact with the fluidized coke powders and perform the cracking reaction under the lifting effect of the fluidizing gas.

The atomizing unit 3 can include a raw material input pipe 32 and a plurality of atomizing nozzles 31 disposed on the raw material input pipe 32. An input port 33 of the raw material input pipe 32 is communicated with the heavy oil raw material inlet 11 and is disposed in a single-layer or multilayer ring shape. The nozzles 31 are disposed in a radial opposed design or a tangential swirling design, and the specific selection criteria for the nozzles 31 takes enhancing atomization of the heavy oil raw material and gas-solid contact effect as the criteria.

Furthermore, a water vapor stripping section 4 and a particle size refining section 5 communicated with each other can be further disposed in the above coupling reaction apparatus.

The water vapor stripping section 4 and the particle size refining section 5 are disposed between the cracking section 1 and the gasification section 2, and are communicated with the cracking section 1 and the gasification section 2 respectively. The water vapor stripping section 4 is located above the particle size refining section 5.

During the downward process of the coke particles b in the cracking section 1, the coke particles b pass through the water vapor stripping section 4 at first to subject a water vapor stripping treatment, so as to remove the light oil-gas carried on the surfaces of the coke particles b. Then, the coke particles having passed through the water vapor stripping section 4 pass through the particle size refining section 5. The coke particles are crushed and screened in the particle size refining section 5 to prevent the coke particles from being difficult to undergo the gasification reaction in the gasification section 2 due to the agglomeration and growth of the coke particles. Specifically, the crushing and screening on the coke particles can be performed by the effect of high-speed grinding water vapor.

It can be understood that a stripping water vapor inlet 41 needs to be disposed at the water vapor stripping section 4, and a grinding water vapor inlet 51 needs to be disposed at the particle size refining section 5.

By disposing the water vapor stripping section 4 and the particle size refining section 5 in the coupling reaction apparatus, the effective separation of the gasification section 1 and the cracking section 2 can be realized, which guarantees relatively independent reaction areas for the gasification reaction and the cracking reaction, and also could avoid agglomeration of the coke particles, so as to improve safety and operation stability of the deep lightening of the heavy oil raw material a.

In a specific implementation process, the water vapor stripping section 4 may include a multi-layer stripping structure 42, so that the light oil-gas on the surfaces of the coke particles is removed by the action of stripping water vapor entering via the stripping water vapor inlet 41. In detail, the multi-layer stripping structure 42 can adopt a combination of one or more stripping structures consisting of a herringbone baffle, an annular baffle, a cone baffle, a grid baffle, bulk packing or regular packing.

The particle size refining section 5 may include a jet grinder 52, which is used to crush and screen the coke particles having been treated with the water vapor stripping section 4, by using the water vapor entering from the grinding water vapor inlet 51, so as to ensure that the coke particles entering the gasification section 2 can have a larger contact area with the gasification agent c and to ensure efficiency of the gasification reaction.

Furthermore, the above coupling reaction apparatus can further include a gas-solid separation section 6, which is disposed above the cracking section 1 to perform a gas-solid separation treatment on oil-gas in the cracking section 1.

In the cracking section 1, there are the light oil-gas generated by the cracking reaction of the heavy oil raw material a and the synthesis gas from the gasification section 2. Before the light oil-gas and the synthesis gas are discharged from the coupling reaction apparatus, a mixture flow e of the light oil-gas and the synthesis gas can be subjected to the gas-solid separation treatment, which on the one hand can remove solid particles (such as coke powders and coke particles) carried in the mixture flow e, such that the solid particles removed fall back to the cracking section 1 to continue serve as a cracking carrier, and on the other hand can cool the mixture flow e to prevent the mixture flow e from continue to coking in a high temperature state, therefore, the quality of the light oil-gas is further improved.

After the mixture flow e enters the gas-solid separation section 6, the separated solid particles are outputted from a solid-phase discharge port 62 and return to the cracking section 1, and a clean oil-gas product, of which the solid particles have been removed, can be outputted from the oil-gas outlet 13, and then directly discharged from the coupling reaction apparatus for further processes of fractionation and so on.

The gas-solid separation section 6 may include an apparatus for oil-gas fast extraction and connecting and a gas-solid separation device, where the gas-solid separation device includes a combination of one or more of an axial-flow centrifugal separator and a spiral-flow centrifugal separator commonly used in the art, and in the case that the gas-solid separation device is a combination of many types of separators, the present disclosure does not limit the specific connection relationship of the separators, which may be in series or in parallel with one another.

In order to further inhibit coking of the clean oil-gas product in a high temperature state to continue, a cooling and washing section 7 can be disposed above the gas-solid separation section 6. The cooling and washing section 7 can receive the clean oil-gas product outputted from the gas-solid separation section 6, and then perform further cooling treatment on the clean oil-gas product to make it becomes a low-temperature clean oil-gas product f, and then discharge it from the coupling reaction apparatus through the oil-gas outlet 13. The cooling treatment refers to using a low-temperature liquid (such as washing oil) entering the low-temperature cooling section 7 to contact with the clean oil-gas product, so as to decrease the temperature of the clean oil-gas product and remove some solid particles having a fine particle size that may be carried in the clean oil-gas product.

Specifically, the cooling and washing section 7 can be configured as a built-in packing type structure to enhance the contact between the mixture flow and the low-temperature liquid, or can be configured as a tray type structure to enhance the contact between the mixture flow and the low-temperature liquid.

The built-in packing type structure can include rasching ring, pall ring, cascade ring, berl saddle, intalox saddle, metal intalox saddle, spherical packing and other bulk packings, or a combination of one or more of grid packing, corrugated packing, pulse packing, and other regular packings.

The tray type structure includes a combination of one or more of a bubble cap tray, a sieve tray, a float valve tray, a jet tray and a dual-flow tray.

In a specific implementation process, the washing oil can be the heavy oil raw material. Specifically, the heavy oil raw material can be divided into two routes to enter the cracking section 1, one route of the heavy oil raw material enters through the heavy oil raw material inlet 11 and directly contacts with the coke powders to perform the cracking reaction, and the other route of the heavy oil raw material, serving as the washing oil, first enters the cooling and washing section 7 for heat exchange, then carries the heat to go downward and output from the reactor, and then enters the cracking section 1 through the heavy oil raw material inlet 11 to perform the cracking reaction, thereby effectively reducing energy consumption required for the cracking reaction. In the present disclosure, the heavy oil raw material serving as the washing oil is 5-10% of the total mass of the heavy oil raw material.

Figure 2:
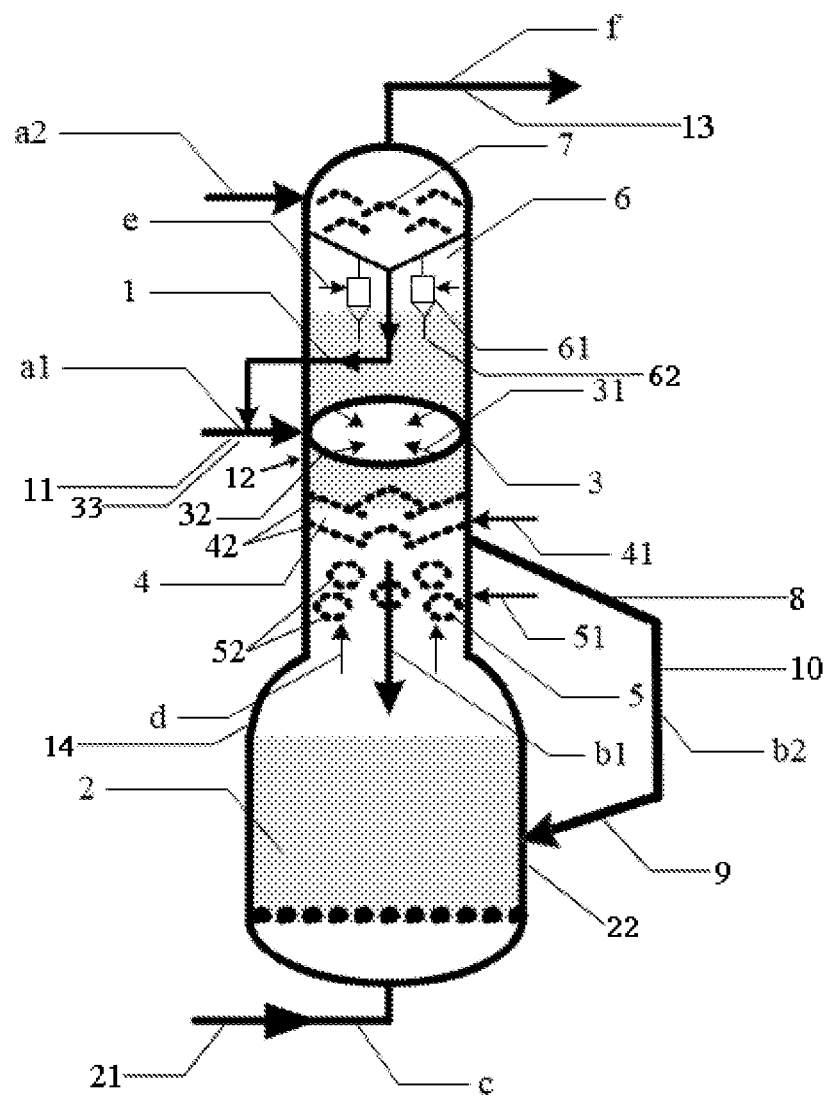
FIG. 2 is a structural schematic diagram of another embodiment of a coupling reaction apparatus for heavy oil cracking-gasification according to the present disclosure.

As shown in FIG. 2 for detail, FIG. 2 is a structural schematic diagram of another embodiment of a coupling reaction apparatus for heavy oil cracking-gasification according to the present disclosure. In FIG. 2, the heavy oil raw material is divided into two routes to enter the cracking section, one route of the heavy oil raw material a1 enters through the heavy oil raw material inlet 11 and directly contacts with the coke powders to perform the cracking reaction, and the other route of the heavy oil raw material a2, serving as the low-temperature liquid, first enters the cooling and washing section 7 for heat exchange, and then goes downward and outputs from the coupling reaction apparatus and then enters the cracking section 1 through the heavy oil raw material inlet 11 to perform the cracking reaction, thereby effectively reducing the energy consumption required for the cracking reaction.

In addition, in the coupling reaction apparatus in FIG. 2, a solid-phase outlet 8 is disposed between the water vapor stripping section 4 and the particle size refining section 5; and the gasification section 2 is provided with a solid-phase inlet 9; and the solid-phase outlet 8 is communicated with the solid-phase inlet 9 through a delivery pipeline 10 outside the coupling reactor.

In FIG. 2, an input end of the delivery pipeline outside the coupling reaction apparatus is communicated with the solid-phase outlet located between the water vapor stripping section 4 and the particle size refining section 5, and an output end of the delivery pipeline is communicated with the solid-phase inlet of the gasification section 2.

In the coupling reaction apparatus shown in FIG. 2, the coke particles, after going downward from the cracking section 1, go through the water vapor stripping section 4 to perform the water vapor stripping treatment, and then during the process of going downward to the particle size refining section 5, coke particles b1 having a small particle size can directly enter the particle size refining section 5 for grinding and crushing and then go downward to the gasification section 2; while coke particles b2 having a big particle size can enter the gasification section 2 through the delivery pipeline 10 to avoid the treatment of the particle size refining section, so as to prevent blockage of the coke particles having a big particle size during the downward process, which increases stability and reliability of the apparatus operation.

In the following, by using the coupling reaction apparatus for heavy oil cracking-gasification in FIG. 1, the actual effects for the apparatus on treating the heavy oil raw material are described in detail.

The coupling reaction apparatus for heavy oil cracking-gasification includes:

a cracking section 1 and a gasification section 2 communicated with each other, and the cracking section 1 is located above the gasification section 2; the cracking section 1 includes a heavy oil raw material inlet 11 and a fluidizing gas inlet 12; and the gasification section 2 includes a gasification agent inlet 21 and an ash discharge outlet 22.

Specifically, the cracking section 1 is a cracking reactor including a fluidized bed, and the gasification section 2 is a gasification reactor including a fluidized bed. The bottom of the cracking reactor and the top of the gasification reactor are communicated with each other and are coaxially disposed to facilitate transportation and circulation of materials. The fluidized bed in the cracking reactor enables coke powders to be in a fluidized state and to serve as a carrier for cracking reaction under the effect of a fluidizing gas entering through the fluidizing gas inlet 12; the fluidized bed in the gasification reactor enables coke particles to be in a fluidized state and to contact with a gasification agent c for gasification reaction under the effect of the gasification agent c entering through the gasification agent inlet 21.

The coupling reaction apparatus for heavy oil cracking-gasification further includes:

a water vapor stripping section 4 located between the cracking section 1 and the gasification section 2, and is configured to perform a water vapor stripping treatment on the coke particles b going downward from the cracking section 1;

a particle size refining section 5 located between the water vapor stripping section 4 and the gasification section 2, and is configured to perform a particle size refinement treatment on the coke particles that have been treated by the water vapor stripping section 4;

an atomizing unit 3 communicated with the heavy oil raw material inlet 11, and is configured to perform an atomization treatment on the heavy oil raw material a entering the cracking section 1 through the heavy oil raw material inlet 11;

a gas-solid separation section 6 located above the cracking section 1, and is configured to perform a gas-solid separation treatment on a mixture flow e of light oil-gas and synthesis gas in the cracking section 1, and includes two gas-solid separators 61;

a cooling and washing section 7 located above the gas-solid separation section 6, and is configured to receive a clean oil-gas product outputted from the gas-solid separation section 6 after being subjected to the gas-solid separation treatment, and to perform a cooling and washing treatment on it, and then a low-temperature clean oil-gas product f generated by the cooling and washing treatment is outputted from the coupling reaction apparatus for heavy oil cracking-gasification via the oil-gas outlet 13.

A method for performing heavy oil cracking-gasification by using the apparatus provided in FIG. 1 is briefly described as follows:

the heavy oil raw material a enters the cracking section 1 through the heavy oil raw material inlet 11, and is treated by the atomization unit 3, and then contacts with the fluidized coke powders in an atomized state to perform the cracking reaction, so as to generate the coke particles b and light oil-gas.

The coke particles b go downward under the effect of gravity, and are subjected to the treatments of the water vapor stripping section 4 and the particle size refining section 5 in turn, and then go downward to the gasification section 2 to perform the gasification reaction with the gasification agent c, so as to generate the synthesis gas d. With the continuous generation of the synthesis gas d, the synthesis gas d goes upward to the cracking section 1, and the synthesis gas d not only provides reaction energy for the cracking reaction, of which the hydrogen but also can inhibit the coking reaction of the heavy oil cracking reaction, thereby improving heavy oil cracked product distribution, and improving quality and yield of the oil-gas. Moreover, the synthesis gas d can fully fluidize the coke particles in the cracking section 1.

After the synthesis gas d is mixed with the light oil-gas as the mixture flow e in the cracking section 1, the mixture flow e go upward to the gas-solid separation section 6 for the gas-solid separation treatment, and the solid particles outputted through the gas-solid separation treatment return to the cracking section 1 to continue serve as a bed material for the cracking reaction, and the clean oil-gas product outputted through the gas-solid separation treatment go upward to the cooling and washing section 7 for the cooling and washing treatment, and the low-temperature clean oil-gas product f finally is outputted from the oil-gas outlet 13 for a subsequent fractionation treatment to obtain products of light oil, cracked gas (dry gas, liquefied gas, etc.) and synthesis gas.

A vacuum residue oil in a domestic refinery is treated using the above apparatus. Table 1 shows properties of the vacuum residue oil to be treated in the domestic refinery.

TABLE 1

| | |
|---|---|
| Density (20° C.), g · cm$^{-3}$ | 0.942 |
| Carbon residue value (wt. %) | 16.57 |
| n(H)/n(C) (molar ratio) | 1.58 |
| Relative molecular weight | 838 |
| C (wt %) | 87.63 |
| H (wt %) | 11.38 |
| S (wt %) | 0.24 |
| N (wt %) | 0.65 |

It can be known from Table 1 that the raw oil has a large density and a high carbon residue value. And the raw oil has an initial boiling point of about 485° C., which belongs to heavy raw oil that is difficult to be converted.

The vacuum residue oil in Table 1 as a raw material is subjected to heavy oil cracking and conversion by using the apparatus shown in FIG. 1. 3 Mpa and 500° C. are selected as cracking reaction conditions, and the fluidized coke powders are used as the fluidization reaction bed material for the cracking section, and a mixture gas consisting of water vapor and synthesis gas is used as a fluidization and reaction atmosphere for the heavy oil cracking and conversion. The distribution of the resulting heavy oil cracked products is shown in Table 2, and is compared with the product distribution in a traditional delayed coking reactor.

TABLE 2

| Cracked product yield (wt. %) | Delayed coking reactor | Cracking-gasification coupling reaction apparatus |
|---|---|---|
| Cracked gas (<C4 components) | 13.28 | 13.11 |
| Liquid products (including heavy oil components, one-way conversion) | 61.87 | 71.06 |
| Coke | 24.86 | 15.73 |

It can be seen from Table 2 that: compared with the traditional delayed coking reactor, in the coupling reaction apparatus for heavy oil cracking-gasification, due to the high-efficiency coupling among a plurality of reaction sections and the enhanced effect of the synthesis gas on the heavy oil cracking reaction process, the liquid yield (weight) in the cracking process is increased by about 10%, and a coke yield in the delayed coking reactor is about 1.5 times of the carbon residue value of the raw oil, while the coke yield in the cracking-gasification coupling reaction apparatus is less than the coke value of the raw oil, and the coke yield is greatly reduced. In addition, the coupling of the cracking section and the gasification section can realize direct gasification of hot coke to prepare hydrogen-rich synthesis gas in the coupling reaction apparatus, thereby avoiding the formation of petroleum coke products with low value.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent substitutions to some or all of the technical features, and these modifications or substitutions do not make the nature of the corresponding technical solutions depart from the scope of the technical solutions of embodiments of the present disclosure.

What is claimed is:

1. A coupling reaction apparatus for heavy oil cracking-gasification, comprising:
   a cracking section and a gasification section communicated with each other, and the cracking section is located above the gasification section;
   the cracking section is provided with a heavy oil raw material inlet and a fluidizing gas inlet, and an upper part of the cracking section is provided with an oil-gas outlet; and
   the gasification section is provided with a gasification agent inlet;
   wherein the coupling reaction apparatus further comprises a water vapor stripping section and a particle size refining section communicated with each other;
   the water vapor stripping section and the particle size refining section are disposed between the cracking section and the gasification section, and are communicated with the cracking section and the gasification section respectively;
   the water vapor stripping section is located above the particle size refining section; and
   the water vapor stripping section is provided with a stripping water vapor inlet, and the particle size refining section is provided with a grinding water vapor inlet.

2. The coupling reaction apparatus according to claim 1, wherein further comprising a gas-solid separation section, and the gas-solid separation section is located above the cracking section, and is configured to perform a gas-solid separation treatment on oil-gas in the cracking section.

3. The coupling reaction apparatus according to claim 2, wherein further comprising a cooling and washing section, and the cooling and washing section is located above the gas-solid separation section, and is configured to perform cooling and washing on the oil-gas treated by the gas-solid separation treatment.

4. The coupling reaction apparatus according to claim 1, wherein further comprising an atomizing unit, and the atomizing unit is communicated with the heavy oil raw material inlet, and is configured to perform an atomization treatment on a heavy oil raw material.

5. The coupling reaction apparatus according to claim 2, wherein further comprising an atomizing unit, and the atomizing unit is communicated with the heavy oil raw material inlet, and is configured to perform an atomization treatment on a heavy oil raw material.

6. The coupling reaction apparatus according to claim 3, wherein further comprising an atomizing unit, and the atomizing unit is communicated with the heavy oil raw material inlet, and is configured to perform an atomization treatment on a heavy oil raw material.

7. The coupling reaction apparatus according to claim 1, wherein a solid-phase outlet is disposed between the water vapor stripping section and the particle size refining section; and
   the gasification section is provided with a solid-phase inlet;
   the solid-phase outlet is communicated with the solid-phase inlet through a delivery pipeline outside the coupling reaction apparatus.

8. The coupling reaction apparatus according to claim 2, wherein a solid-phase outlet is disposed between the water vapor stripping section and the particle size refining section; and
   the gasification section is provided with a solid-phase inlet;
   the solid-phase outlet is communicated with the solid-phase inlet through a delivery pipeline outside the coupling reaction apparatus.

9. The coupling reaction apparatus according to claim 3, wherein a solid-phase outlet is disposed between the water vapor stripping section and the particle size refining section; and
   the gasification section is provided with a solid-phase inlet;
   the solid-phase outlet is communicated with the solid-phase inlet through a delivery pipeline outside the coupling reaction apparatus.

10. The coupling reaction apparatus according to claim 4, wherein a solid-phase outlet is disposed between the water vapor stripping section and the particle size refining section; and
    the gasification section is provided with a solid-phase inlet;
    the solid-phase outlet is communicated with the solid-phase inlet through a delivery pipeline outside the coupling reaction apparatus.

11. The coupling reaction apparatus according to claim 1, wherein the cracking section is a cracking reactor, and the gasification section is a gasification reactor.

12. The coupling reaction apparatus according to claim 11, wherein the cracking reactor is coaxially communicated with the gasification reactor.

13. The coupling reaction apparatus according to claim 12, wherein a diameter ratio of the cracking reactor to the gasification reactor is 1:(1.5-4).

14. The coupling reaction apparatus according to claim 1, wherein an operation pressure inside the coupling reaction apparatus is 0.1-6 Mpa.

* * * * *